(No Model.)

M. I. REMY.
IRONING MACHINE.

No. 275,081. Patented Apr. 3, 1883.

Witnesses:
E. E. Sickler
Frank A. Jacob

Inventor
Marion I. Remy
By H. P. Hood
Atty.

UNITED STATES PATENT OFFICE.

MARION I. REMY, OF COLUMBUS, INDIANA.

IRONING-MACHINE.

SPECIFICATION forming part of Letters Patent No. 275,081, dated April 3, 1883.

Application filed October 30, 1882. (No model.)

*To all whom it may concern:*

Be it known that I, MARION I. REMY, a resident of Columbus, in the county of Bartholomew and State of Indiana, have invented a new and useful Improvement in Ironing-Machines, of which the following is a specification, having reference to the accompanying drawings.

The object of my invention is to provide an ironing-machine adapted for household use.

My invention consists, first, in combining with a cylinder having a cloth-covered or yielding surface and adapted to be revolved a hollow smoothing-iron adapted to be heated from the inside, having differently-shaped smoothing-surfaces, and means for securing the smoothing-iron with either of its smoothing-surfaces in contact with the cylinder, as hereinafter fully described.

My invention consists, further, in the means for supporting and adjusting the before-mentioned cylinder and smoothing-iron so that a greater or less portion of their surfaces may be in contact.

My invention further consists in a means for sustaining the before-mentioned smoothing-iron, whereby it may be readily brought in contact with or be removed from contact with the cylinder.

The accompanying drawings illustrate my invention.

Figure 2:
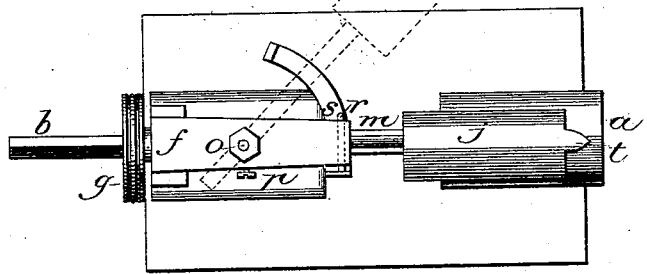
Figure 3:
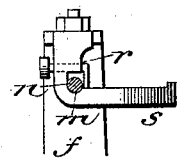
Figure 1:
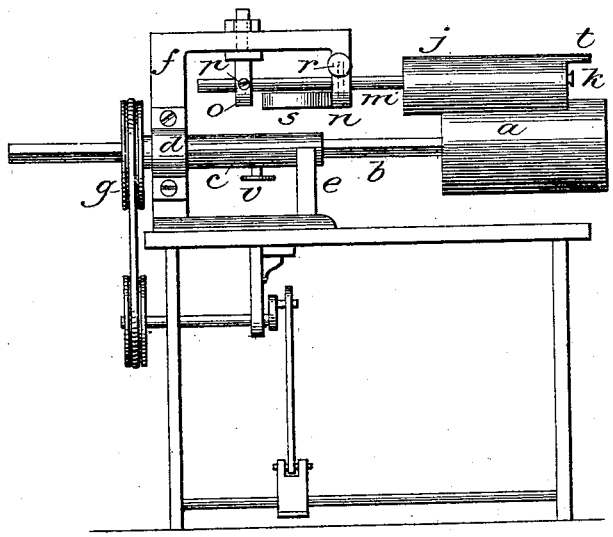
Figure 1:
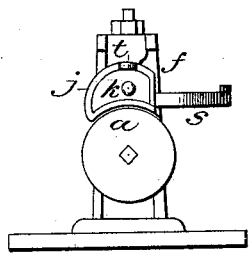

Figure 1 is a side elevation, Fig. 2 a plan, and Fig. 3 an end view, of the cylinder and smoothing-iron, and also of one end of the supporting-frame.

Like letters refer to the same parts in all the figures.

A cylinder, $a$, having a covering of cloth or other soft elastic surface, is mounted on one end of a shaft, $b$. Said shaft is sustained in a long journal, $c$. The shape of the shaft and the interior of the journal is such that the shaft may slide easily longitudinally through the journal, but will not turn therein. I prefer to make it square. Journal $c$ is sustained by and is adapted to revolve in bearings $d$ and $e$, which are formed in the main frame $f$. A driving-pulley, $g$, is secured to the outer end of journal $c$, and power may be applied in any suitable way to cause the same to revolve. An ordinary sewing-machine table, with its crank-shaft, treadle, and pulley, as shown, is a convenient form.

$j$ is a hollow smoothing-iron, designed to be heated by a hot slug inserted through the opening closed by the door $k$. Said iron is of the same length as cylinder $a$, and has one of its polished sides made concave longitudinally to fit the periphery of the cylinder. The edges and top surface of $j$ are made convex; or, if desired, one edge may be convex and the other flat, as shown at Fig. 3. My object in making one side of the smoothing-iron concave is to give a large contact-surface with the work when placed on the cylinder, thereby smoothing much more easily and rapidly on plain work than the cylindrical smoothing-irons heretofore used. Smoothing-iron $j$ is secured to one end of a cylindrical shaft, $m$, which rests in a bearing at $n$ in the frame $f$, and also in a swivel-bearing, $o$, attached to frame $f$. Bearing $n$ is made somewhat larger vertically than shaft $m$. Shaft $m$ is designed to slide longitudinally in its bearings, and also to revolve therein, for the purpose of presenting either of the differently-shaped surfaces to the revolving cylinder, and is held in place when adjusted and prevented from revolving or sliding by a set-screw, $p$. Bearing $n$ is open at the back side, and shaft $m$ is retained therein when iron $j$ is opposite cylinder $a$ by a turn-pin, $r$. Attached to the frame $f$, below bearing $n$, and having its top surface level with the bottom of said bearing, is a curved arm, $s$, concentric with swivel-bearing $o$.

Projecting from the outer end of smoothing-iron $j$, in a line with the convex surface thereof, is a polished tapering horn, $t$, for the purpose of ironing folds and creases, as the gathered portions of skirts, &c.

The operation of my device is as follows: For smoothing ordinary work, cylinder $a$ and iron $j$ are adjusted opposite each other, the hollow or concave surface of $j$ being presented to the cylinder and resting thereon. A hot slug is inserted in $j$, and cylinder $a$ is revolved by the revolutions of pulley $g$ and journal $c$. The work is now inserted between $j$ and $a$, and is drawn through and smoothed, the large contact-surface of the smoothing-iron smoothing rapidly and easily with a moderate pressure. For smoothing wristbands of shirts and like articles, cylinder *a* is slid forward in its bearing and smoothing-iron *j* backward in its bearings until only a short portion of their surfaces is in contact, corresponding in length to the width of the band. The wristband is first smoothed by passing under the concave surface of *j*. Set-screw *p* is then released and *j* is turned over, presenting its convex surface to *a*, and the work is polished by repeatedly passing it under said surface. For ironing gathers or ruffles, cylinder *a* is slipped forward till only the horn *t* is in contact with the cylinder. The skirt is now slipped over the cylinder, the horn resting in the gathers, the cylinder is revolved, and the gathers are carried in succession under the horn as the cylinder is revolved. To prevent burning cylinder *a* when at rest, shaft *m* is released from bearing *n* and the iron is swung backward, the shaft being supported by the curved arm *s*, the swivel-bearing *o* yielding to the new position of the shaft. Shaft *b* is secured in journal *c* by set-screw *v*.

I claim as my invention—

1. In an ironing-machine, the combination, with a revolving cylinder having a cloth-covered or yielding periphery, of a hollow reversible smoothing-iron having a polished concave surface adapted to fit the periphery of said cylinder, and also a polished convex surface, and means for securing the said smoothing-iron with its concave or convex surface in contact with the periphery of the cylinder, substantially as set forth.

2. In an ironing-machine, the above-described means for supporting smoothing-iron *j* in contact with or out of contact with cylinder *a*, consisting of main frame *f*, swivel-bearing *o*, shaft *m*, adapted to turn and to slide therein, open bearing *n*, curved arm *s*, and pin *r*, all combined substantially as specified.

3. In an ironing-machine, a hollow smoothing-iron provided with a narrow projecting portion adapted to be brought in contact with a revolving cylinder and to enter between the folds of garments, substantially as and for the purpose specified.

MARION I. REMY.

Witnesses:
SARAH E. IRWIN,
J. R. DUNLAP.